(12) United States Patent
Kistler et al.

(10) Patent No.: US 12,207,370 B2
(45) Date of Patent: Jan. 21, 2025

(54) DETERMINATION OF STREET CONDITION BY ACOUSTIC MEASUREMENT

(71) Applicant: TRIDONIC GMBH & CO KG, Dornbirn (AT)

(72) Inventors: Roger Kistler, Dornbirn (AT); Markus Künzli, Dornbirn (AT)

(73) Assignee: Tridonic GmbH & Co KG, Dornbirn (AT)

( * ) Notice: Subject to any disclaimer, the term of this patent is extended or adjusted under 35 U.S.C. 154(b) by 92 days.

(21) Appl. No.: 17/625,149

(22) PCT Filed: Feb. 9, 2021

(86) PCT No.: PCT/EP2021/053063
§ 371 (c)(1),
(2) Date: Jan. 6, 2022

(87) PCT Pub. No.: WO2021/160603
PCT Pub. Date: Aug. 19, 2021

(65) Prior Publication Data
US 2022/0369441 A1    Nov. 17, 2022

(30) Foreign Application Priority Data
Feb. 10, 2020    (EP) ..................... 20156291

(51) Int. Cl.
*H05B 47/12*    (2020.01)
*F21S 8/08*    (2006.01)
(Continued)

(52) U.S. Cl.
CPC .............. *H05B 47/12* (2020.01); *F21S 8/085* (2013.01); *H05B 45/10* (2020.01); *H05B 45/20* (2020.01)

(58) Field of Classification Search
CPC ......... F21S 8/085; H05B 45/10; H05B 45/20; H05B 47/12
See application file for complete search history.

(56) References Cited

U.S. PATENT DOCUMENTS

| 7,973,507 B2 * | 7/2011 | Yoshigoe | B60S 1/0818 |
| | | | 318/483 |
| 2012/0206050 A1 * | 8/2012 | Spero | H05B 45/395 |
| | | | 315/152 |

(Continued)

FOREIGN PATENT DOCUMENTS

WO    2019115599    6/2019

OTHER PUBLICATIONS

PRICAI 2014: Trends in Artificial Intelligence pp. 104-116. (Year: 2014).*

(Continued)

*Primary Examiner* — Alexander H Taningco
*Assistant Examiner* — Pedro C Fernandez
(74) *Attorney, Agent, or Firm* — Andrus Intellectual Property Law, LLP (57) ABSTRACT

The present invention provides a luminaire (1), in particular a street lamp. The luminaire comprises at least one lighting means (5), such as at least one light emitting diode, at least one sensor unit (15) including an acoustic sensor (2) configured to measure environmental sound, and further comprising a processing unit (3). The processing unit (3) is configured to identify an environmental situation of the luminaire (1), in particular the street condition at the street lamp, on the basis of at least one characteristic of the measured environmental sound, such as the amplitude, frequency or pattern of the measured environmental sound and/or control information for controlling light emission.

17 Claims, 3 Drawing Sheets

(51) Int. Cl.
*H05B 45/10* (2020.01)
*H05B 45/20* (2020.01)

(56) References Cited

U.S. PATENT DOCUMENTS

| | | | |
|---|---|---|---|
| 2013/0145839 A1* | 6/2013 | Niemann | G01N 29/2437 |
| | | | 73/170.17 |
| 2018/0105139 A1* | 4/2018 | Park | B60S 1/0818 |
| 2018/0124900 A1* | 5/2018 | Rajagopalan | H05B 47/105 |
| 2020/0357257 A1* | 11/2020 | Pluimers | G08B 21/10 |

OTHER PUBLICATIONS

International Search Report dated Apr. 21, 2021 in parent application PCT/EP2021/053063.

Ferroudj et al: Detection of Rain in Acoustic Recordings of the Environment, Dec. 1, 2014, International Conference on Financial Cryptography and Data Security; [lecture notes in computer science; lect. notes computer], Springer, Berlin, Heidelberg, pp. 104-116, XP047311103, ISBN: 978-3-642-17318-9, pp. 108, 110.

* cited by examiner

DETERMINATION OF STREET CONDITION BY ACOUSTIC MEASUREMENT

CROSS REFERENCE TO RELATED APPLICATIONS

The present application is the U.S. national stage application of international application PCT/EP2021/053063 filed Feb. 9, 2021, which international application was published on Aug. 19, 2021 as International Publication WO 2021/160603 A1. The international application claims priority to European Patent Application 20156291.5 filed Feb. 10, 2020.

FIELD OF THE INVENTION

The present invention relates to a luminaire, in particular a street lamp, comprising at least one acoustic sensor; systems, in particular street lighting systems, comprising such a luminaire; a method for identifying an environmental situation by such a luminaire; and a method for operating such a luminaire.

BACKGROUND OF THE INVENTION

In the prior art, luminaires, such as street lamps, are well known for providing light to an area, such as a street.

It is an advantage to adapt the lighting by luminaires to environmental situations. Namely, this allows to reduce energy consumption and to increase the safety for persons. For example, in case there has been a snowfall, it is advantageous to increase the light emission by street lamps at places where the street is covered by snow in order for persons walking in this area or vehicles driving in this area to have a better sight of slippery spots on the street due to the snow. At places without snow, the light emission may be kept constant or reduced in order to save energy.

At the moment, a weather forecast is used in order to determine an environmental situation of luminaires, such as street lamps. This is not very accurate and, thus, does not allow the above described advantageous adaption of light emission to environmental situations. Video cameras may be used for monitoring the environmental situation, which causes high costs, or a person may check the environmental situation on site, which is unpractical.

Therefore, it is an object of the present invention to provide a luminaire that overcomes the above-described disadvantages, in particular that allows an accurate determination of an environmental situation at the luminaire.

These and other objects, which become apparent upon reading the following description, are solved by the subject-matter of the independent claim. The dependent claims refer to preferred embodiments of the invention.

SUMMARY OF THE INVENTION

According to an aspect of the invention a luminaire, in particular a street lamp, is provided. The luminaire comprises at least one lighting means, such as at least one light emitting diode, at least one sensor unit including an acoustic sensor configured to measure environmental sound, and further comprising a processing unit. The processing unit is configured to identify an environmental situation of the luminaire, in particular the street and/or weather condition at the street lamp, on the basis of at least one characteristic of the measured environmental sound, such as the amplitude, frequency or pattern of the measured environmental sound.

In other words, the invention proposes to measure the environmental sound at a luminaire and to identify the environmental situation of the luminaire on the basis of the measured environmental sound directly in the sensor unit.

The term "determine" may be used as a synonym for the term "identify".

For example, the sound caused by a vehicle driving over ice or snow on a street is different to the sound caused by the vehicle driving on a street without ice or snow. Thus, the processing unit in the sensor unitmay identify on the basis of the environmental sound whether there is ice or snow present on the street or not. Other weather conditions, such as light rainfall, heavy rainfall, wind, thunder etc., each cause a characteristic environmental sound that is indicative of/characteristic of the respective weather condition. For example, in case there is heavy rainfall, this causes an environmental sound indicative of the heavy rainfall, which may be measured by the at least one acoustic sensor included in the sensor unit of the luminaire. The processing unit in the sensor unitof the luminaire may then identify on the basis of the measured environmental sound the presence of heavy rainfall as the environmental situation of the luminaire. The term "characteristic of" may be used as a synonym for the term "indicative of".

Moreover, street users, such as vehicles, motorcycles, bicycles, persons etc., each cause a characteristic environmental sound that is indicative of the respective street user.

For example, in case there is a vehicle passing by the luminaire, this causes an environmental sound indicative of the moving vehicle, which may be measured by the at least one acoustic sensor of the luminaire. The processing unit of the luminaire may then identify on the basis of the measured environmental sound the passing by of a vehicle as the environmental situation of the luminaire.

Furthermore, the sound caused by a vehicle driving on a street with a damage, such as a pothole, is different to the sound caused by the vehicle driving on a street without any damage, i.e. with a smooth street surface. Thus, the processing unit may identify on the basis of the environmental sound whether the street comprises a damage, such as a pothole, or not.

In particular, the processing unit is configured to identify on the basis of at least one characteristic of the measured environmental sound the environmental situation of the luminaire and thus, e.g., the weather condition at the luminaire.

In case the luminaire is a street lamp, the processing unit is preferably configured to identify on the basis of at least one characteristic of the measured environmental sound the environmental situation of the luminaire and thus, e.g., the weather condition and street condition at the luminaire.

The street condition may comprise the traffic condition on the street and/or the state of the street, such as whether there are damages, e.g. potholes, snow, ice and/or water present on the street or not.

The identified environmental situation (identified environmental condition) may comprise a weather condition and/or a street condition, in particular a weather condition, a traffic condition on a street and/or the state of the street.

The at least one characteristic of the environmental sound may be the amplitude, frequency or pattern of the environmental sound. Preferably, the processing unit is configured to identify the environmental situation of the luminaire on the basis of a plurality of characteristics of the measured environmental sound. In particular, the processing unit is configured to identify the environmental situation of the luminaire on the basis of the amplitude, frequency and/or pattern of the measured environmental sound.

Other environmental situations that may be identified could be pedestrians walking on the street, which could be identified based on the sound of shoes on the ground, or a conversation of the pedestrians.

The at least one lighting means preferably corresponds to one or more light emitting diodes (LED), such as organic light emitting diodes, inorganic light emitting diodes etc., which may be electrically connected in parallel and/or in series. The at least one lighting means is not limited to one or more light emitting diodes, but may alternatively or additionally correspond to other lighting means, such as one or more fluorescence lamps, compact fluorescent lamps etc.

Preferably, the at least one acoustic sensor comprises or corresponds to a microphone. The at least one acoustic sensor is not limited thereto, but may alternatively or additionally comprise or correspond to at least one other sensor configured to measure sound respectively sensor element configured to measure sound. The terms "ambient sound", "environmental noise" and "ambient noise" may be used as synonyms for the term "environmental sound". The present invention is not limited to a specific measurement method for measuring sound by the at least one acoustic sensor.

In particular, the at least one acoustic sensor is configured to measure the environmental sound in the vicinity of the luminaire and, thus, the processing unit is configured to identify the environmental situation in the vicinity of the luminaire based on the measured environmental sound. That is, the processing unit is configured to identify on the basis of the at least one characteristic of the measured environmental sound the environmental situation at the luminaire respectively in the vicinity of the luminaire.

The processing unit preferably comprises or corresponds to a controller, microcontroller, processor, microprocessor, application-specific integrated circuit (ASIC) or any combination of these elements. The processing unit is preferably a part of the at least one acoustic sensor.

The term "ambient situation" may be used as a synonym for the term "environmental situation".

Preferably, the luminaire is a luminaire for outdoor lighting (outdoor luminaire). In particular, the luminaire is a street lamp. In case the luminaire is a street lamp, the processing unit is configured to identify on the basis of the environmental sound measured by the at least one acoustic sensor the street condition at the street lamp respectively the street condition within the vicinity of the street lamp.

The luminaire is not limited to being a luminaire for outdoor lighting, in particular a street lamp, but may also be a different type of luminaire, such as a luminaire for indoor lighting (indoor luminaire).

Preferably, the processing unit is configured to detect a change of the at least one characteristic of the environmental sound measured by the at least one acoustic sensor and to identify on the basis of the detected change of the at least one environmental sound characteristic the environmental situation of the luminaire.

That is, the processing unit is configured to detect a change of the environmental sound (or at least one characteristic thereof) measured by the at least one acoustic sensor and to identify on the basis of the detected change of the environmental sound the environmental situation of the luminaire. For example, in case the acoustic sensor measures sound caused by rain drops falling on the ground and the measured sound changes to a sound caused by rain drops falling on the top of a vehicle, the processing unit may detect this change of environmental sound and may identify on the basis of this detected change the presence of a vehicle in addition to the presence of the rainfall as the environmental situation.

The term "environmental sound characteristic" may be used as a synonym for the passage "characteristic of the environmental sound measured by the at least one acoustic sensor".

Further, the processing unit is configured to control the light emission by the at least one lighting means, in particular to change the light intensity, light color and/or color temperature of the light emission, on the basis of the identified environmental situation. Controlling the light emission is achieved by outputting information on the identified environmental situation, or by generating and providing control information (a control signal) for adjusting light parameters as required, directly. In case that control information is generated in the sensor unit by the processing unit, a look-up table may be used which stores an association of identified environmental situations with respective control information. For example, control information causing a change of the emitted light to amber may be stored in the table associated with the environmental situation "rain". In case rain is identified to be the current environmental situation, switching the emitted light to amber or another adapted spectrum will reduce blinding. Individual spectra can be associated to environmental situations like rain, snowfall, fog, for example.

For example, in case the identified environmental situation comprises local dangers, such as ice on the ground, the processing unit is preferably configured to change the light intensity, light color and/or color temperature of the light emission by the at least one lighting means of the luminaire in order to indicate to a street user, such as a person or driver of a vehicle, passing by the luminaire that in the vicinity of the luminaire slippery spots due to ice are present. In particular, the processing unit may control the at least one lighting means to increase the light intensity of its light emission in order for the street user passing by the luminaire to be able to better see the local dangers, such as the slippery spots on the ground. In addition or alternatively, the processing unit may control the at least one lighting means to change the color temperature of its light emission to e.g. a cold color temperature in order to warn the street user of the presence of the local dangers, such as the slippery spots on the ground. In case of persons identified to walk by, or also vehicles passing the luminaire, a geometry of the light emission may be adapted. Such adaptation may include adaptation of an opening angle and/or adjusting the direction of the light emission.

Preferably, the processing unit is configured to respond to the identified environmental situation by controlling the light emission by the at least one lighting means in the following ways:

The processing unit may be configured to adapt the emission characteristics of the at least one lighting means on the basis of the identified environmental situation. This allows to avoid a dazzling of a person caused by the identified environmental situation, in case the identified environmental situation comprises respectively corresponds to e.g. ice or snow being present in the vicinity of the luminaire which causes reflection of light.

Additionally or alternatively, the processing unit may be configured to change, e.g. increase, the light intensity/light level, light color and/or light temperature of the light emission by the at least one lighting means on the basis of the identified environmental situation. This allows indicating the presence of local dangers of the identified environmental situation, such as slippery spots on a street due to the presence of ice or snow, and warning a person about these local dangers. In this case, the identified environmental situation comprises or corresponds to the presence of ice or snow.

Additionally or alternatively, the processing unit is configured to change the light emission by the at least one lighting means on the basis of the identified environmental situation such that the identified environmental situation, in particular local dangers of the identified environmental situation (e.g. slippery spots on the ground and/or damages of the ground, such as potholes), are indicated to extern, in particular to a person present in the vicinity of the luminaire. In case the luminaire is a street lamp, street users may be warned of local dangers of the identified environmental situation by this change of light emission causing driving vehicles on the street to reduce their speed.

To sum up, the luminaire according to the present invention allows to dynamically respond to environmental situations which are identified by the sensor unit based on an acoustic measurement.

Preferably, the luminaire comprises at least one further sensor, such as a light sensor for measuring visible light, a motion and/or presence sensor etc., wherein the processing unit is configured to adapt the operating behavior of the at least one further sensor to the identified environmental situation. For example, the processing unit may change the sensitivity and/or operation mode of the at least one further sensor on the basis of the identified environmental situation.

In other words, the luminaire, in particular the processing unit, is preferably configured to locally cause an action respectively response to the identified environmental situation. For example, the processing unit may change the light emission by the at least one lighting means and/or change the operating behavior of the at least one further sensor as a locally performed measure (local measure).

Apart from internally communicating the identified environmental situation in order to allow controlling the light emission, or from communicating a respective control information, the processing unit, or another entity in the luminarire, may also be configured to communicate the identified environmental situation to extern, in particular to at least one external control unit. This allows a central/global response by an external control unit to the environmental situation of the luminaire, as described below with respect to the systems.

Preferably, the processing unit is configured to communicate the identified environmental situation or a message indicative of the identified environmental situation to extern, in particular to at least one external control unit. Additionally or alternatively, the processing unit may communicate control information generated based on the identified environmental situation to extern.

Communication may be performed by a bus system like DALI or DALI-2. One big advantage of the invention, which processes the measured sound data internally in the sensor unit, is that bus systems like DALI or DALI-2 are not designed for communication of large amounts of data, which would be necessary for transmitting measured data to extern for evaluation. With the present invention, only the essence needs to be communicated. This advantage is valid for communication with external units but also internally in the luminaire.

For example, in case the identified environmental situation comprises or corresponds to the presence of a weather condition, such as rainfall, at the luminaire, the processing unit is configured to communicate the occurrence of the weather condition (e.g. rainfall) to at least one external control unit, such as a computer of a forecast station. This allows an accurate report on the weather condition and street condition at the luminaire with a high-resolution for weather forecast stations, in case the luminaire is a street lamp. Moreover, in case the external control unit is a computer at a city administration office responsible for maintaining streets in a good condition, the use of a street service vehicle for street maintenance may be prioritized dependent on the identified environmental situations, such as the presence of ice and/or damages on the street, communicated from different luminaires (street lamps) placed at different streets.

In other words, the luminaire, in particular the processing unit, is preferably configured to cause a central/global action respectively response to the identified environmental situation. For example, the processing unit may communicate a message indicative of the identified environmental situation to at least one central control unit (external control unit). The central control unit may then cause a response to the identified environmental situation, for example, instruct a person to deal with the environmental situation (e.g. taking care of slippery spots and/or damages on the street), as a centrally/globally performed measure (central measure).

Preferably, and as already indicated above, the luminaire comprises a communication interface, such as an interface according to the DALI (Digital Addressable Lighting Interface) industry standard or DALI-2 industry standard. The luminaire, in particular the processing unit, is configured to communicate via the communication interface with extern, in particular with the at least one external control unit.

Preferably, the processing unit is configured to identify on the basis of at least one characteristic of the measured environmental sound the environmental situation out of a list of different environmental situations, wherein the different environmental situations are linked to different values, in particular threshold values, or ranges for the at least one characteristic of the measured environmental sound. The invention thus makes use of the fact that different environmental situations lead to different acoustic spectra, which are then analysed to calculate the above-mentioned at least one property of the measured environmental sound. Additionally or alternatively, the processing unit is preferably configured to identify on the basis of the detected change of the at least one environmental sound characteristic the environmental situation out of a list of different environmental situations, wherein the different environmental situations are linked to different values, in particular threshold values, or ranges for the detected change of the at least one environmental sound characteristic. Additionally or alternatively, the processing unit is preferably configured to identify the environmental situation by processing the measured environmental sound using mathematical algorithms.

Such algorithms are in particular self-learning algorithms, such as algorithms used in machine learning. These algorithms are configured to recognize on the basis of training data the characteristics, such as the amplitude, frequency and pattern, of different types of environmental sound and to assign/associate each of these different types of environmental sound with the respective environmental situation that caused the respective type of environmental sound. Such training data comprise in particular typical/characteristic recordings of different types of environmental sound.

Examples of different types of environmental sound comprise the sound due to a weather condition, such as the sound of rain, the sound of wind, the sound of thunder etc., the sound caused by different types of street users, such as the sound caused by a vehicle, the sound caused by a motorcycle, the sound caused by a bicycle, the sound caused by a person or a group of persons etc., the sound due to different types of traffic conditions, such as the sound of heavy traffic, the sound caused by a state of the street, such as the sound caused by a vehicle driving over a street covered by snow, etc.

Preferably, the processing unit is configured to store the list(s) and/or mathematical algorithms in a storage unit. Additionally or alternatively, the processing unit is preferably configured to receive the list(s) and/or mathematical algorithms from extern. Additionally or alternatively, the processing unit is preferably configured to generate the list(s) and/or mathematical algorithms by machine learning.

Such a machine learning may be performed using one or more different training sequences, which allow the processing unit to learn different types of environmental sound, in particular the characteristics (such as amplitude, frequency and pattern) of the different types of sound, and for each of the different types of sound the respective environmental situation that caused the respective type of environmental sound.

For example, a user records different types of environmental sound and assigns/associates each recorded type of sound to the environmental situation, in particular to the weather condition and/or street condition, which caused the respective type of environmental sound. This may then be input as training data for a training sequence to the processing unit. A machine learning software, preferably comprising one or more machine learning algorithms, of the processing unit and, thus, the processing unit is configured to process the training sequence and, thus, to learn respectively to get to know the characteristics (such as amplitude, frequency and pattern) of the different types of sound as well as the assignment/association between these different types of sound and the corresponding environmental situations. Therefore, the machine learning software (processing unit performing machine learning) learns to distinguish these different types of environmental sound on the basis of the characteristics of the different types of sound. The software is then able to identify on the basis of an environmental sound, in particular on the basis of at least one characteristic of the environmental sound, the corresponding environmental situation that caused the environmental sound. In particular, the machine learning software and, thus, the processing unit is configured to use the learned characteristics of the different types of environmental sound for identifying further types of environmental sound and the corresponding environmental situations. That is, the machine learning software is configured to apply the learned knowledge about the different types of environmental sound and the corresponding environmental situations on further types of environmental sound. The identification is performed by classifying the characteristics determined from the environmental sound.

Preferably, the luminaire comprises a storage unit for storing the list and/or mathematical algorithms. The processing unit is configured to read data from the storage unit and write data to the storage unit. The storage unit may also be called "data storage unit". The storage unit may be a part of the processing unit.

Further, the processing unit is preferably configured to identify the environmental situation using at least one additional information, in particular time information.

Examples of time information may be the time of day, the season, the month etc.

For example, in case the environmental sound measured by the at least one acoustic sensor is indicative of rainfall, the time information can be used by the processing unit for distinguishing between two environmental situations of a street associated to rainfall. For example, in case the time information teaches to the processing unit that it is summer, the processing unit may identify the environmental situation to be a wet street due to the rain. In case the time information teaches to the processing unit that it is winter, the processing unit may identify the environmental situation to be a street with icy spots due to the rain freezing on the cold street. Alternatively or additionally, the at least one additional information, usable by the processing unit for identifying the environmental situation, is preferably temperature information.

Furthermore, the processing unit is preferably configured to detect at least one environmental event, such as a rain drop or a moving vehicle, on the basis of the at least one characteristic of the measured environmental sound and detect the frequency of the occurrence of the detected event within a time range in order to identify at least one characteristic of the identified environmental situation, such as rainfall intensity or traffic density.

The at least one environmental event may be due to a weather condition, such as snowfall, rainfall, wind etc. An example of such an environmental event may be a rain drop caused by rainfall. Alternatively or additionally, the at least one environmental event may be due to a street user, such as vehicles, motorcycles, bicycles, persons etc. An example of such an environmental event may be a moving vehicle. The environmental situation may comprise at least one environmental event.

For example, in case the identified environmental situation comprises or corresponds to the occurrence of rainfall, the processing unit may detect a rain drop as an environmental event on the basis of the at least one characteristic of the measured environmental sound. Further, the processing unit may detect the frequency of occurrence of a rain drop (the environmental event) within a time range in order to identify the rainfall intensity as a characteristic of the identified environmental situation (presence of rainfall).

In case the identified environmental situation comprises or corresponds to the presence of traffic on a street, the processing unit may detect a moving vehicle as an environmental event on the basis of the at least one characteristic of the measured environmental sound. Further, the processing unit may detect the frequency of occurrence of a moving car (the environmental event) within a time range in order to identify the traffic density as a characteristic of the identified environmental situation (presence of traffic on the street).

Moreover, the processing unit is preferably configured to detect at least one environmental event, such as a moving vehicle, on the basis of the at least one characteristic of the measured environmental sound and evaluate the at least one characteristic of the measured environmental sound in order to identify at least one characteristic of the detected environmental event, such as speed or velocity of the moving vehicle.

Preferably, the processing unit is configured to repeatedly measure and process with a time interval the at least one characteristic of the environmental sound measured by the at least one acoustic sensor. Additionally or alternatively, the processing unit is preferably configured to process the at least one characteristic of the environmental sound measured by the at least one acoustic sensor in response to a command received from extern.

In particular the time interval is constant, such that the processing unit is preferably configured to periodically measure and process the environmental sound measured by the at least one acoustic sensor.

In order to achieve the luminaire according to an aspect of the present invention, some or all of the above described optional features may be combined with each other.

According to a further aspect of the invention a system, in particular street lighting system, is provided. The system comprises at least one luminaire, in particular at least one street lamp, and at least one central control unit for controlling one or more luminaires of the system. The at least one luminaire comprises at least one lighting means, such as at least one light emitting diode, and at least one sensor unit including an acoustic sensor configured to measure environmental sound. The processing unit is at least one luminaire is configured to identify an environmental situation of the at least one luminaire, in particular the street condition at the street lamp, on the basis of at least one characteristic of the measured environmental sound, such as the amplitude, frequency or pattern of the measured environmental sound and to communicate the identified environmental situation to the at least one central control unit. The at least one central control unit is configured to control the light emission by the at least one luminaire, in particular to change the light intensity, light color and/or color temperature of the light emission, on the basis of the identified environmental situation.

That is, at least one luminaire of the system may, according to a further aspect of the invention, differ to the luminaire according to an aspect of the invention in that the at least one luminaire does not comprise a processing unit. Nevertheless, such a luminaire may also be controlled by the inventive system, because the central control unit is provided with information on the identified environmental situation or a control information. The central control unit can thus control other luminaires based on such information. The only requirement is that the central control unit and the luminaires are in the same network.

Preferably, the system is a street lighting system, wherein the at least one luminaire is a street lamp.

Preferably, the at least one luminaire comprises a communication interface, such as an interface according to the DALI (Digital Addressable Lighting Interface) industry standard or DALI-2 industry standard. The communication interface is configured to communicate with extern, e.g. with the at least one central control unit. In particular, the at least one luminaire is configured to communicate via the communication interface information, such as the identified environmental situation or control information derived therefrom, to the at least one central control unit.

Preferably, the at least one luminaire comprises at least one further sensor, such as a light sensor for measuring visible light, a motion and/or presence sensor etc., wherein the at least one central control unit is configured to adapt the operating behavior of the at least one further sensor to the identified environmental situation. For example, the at least one central control unit may change the sensitivity and/or operation mode of the at least one further sensor on the basis of the identified environmental situation.

The at least one central control unit preferably comprises or corresponds to a controller, microcontroller, processor, microprocessor, application-specific integrated circuit (ASIC) or any combination of these elements.

The at least one central control unit is preferably configured to cause a central/global action respectively response to the identified environmental situation of the at least one luminaire. For example, the at least one central control unit may change the light intensity, light color and/or color temperature of the light emission by the at least one luminaire on the basis of the identified environmental situation of the at least one luminaire. Additionally or alternatively, the at least one central control unit may adapt the operating behavior of the at least one further sensor of the at least one luminaire to the identified environmental situation of the at least one luminaire.

Additionally or alternatively, the at least one central control unit may cause another response to the identified environmental situation, for example instruct a person to deal with the environmental situation (e.g. taking care of slippery spots and/or damages on the street), as a centrally/globally performed measure (central measure).

Preferably, the system comprises at least one further luminaire, in particular at least one further street lamp, and the at least one central control unit is configured to control the light emission by the at least one further luminaire, in particular to change the light intensity, light color and/or color temperature of the light emission, on the basis of the identified environmental situation.

Preferably, the system comprises at least two luminaires, as described above, wherein each of the at least two luminaires is configured to with the at least one central control unit. The at least one central control unit is configured to identify an overall environmental situation, in particular an overall street condition, of the system using the information received from the at least two luminaires.

That is, in case the at least two luminaires are street lamps arranged along a street, the at least one central control unit is preferably configured to identify an overall street condition of the street on the basis of the measured environmental sound.

Preferably, the at least one central control unit is configured to receive from the respective luminaire information on the environmental situation of the respective luminaire. Then the at least one central control unit is configured to identify an overall environmental situation, in particular an overall street condition, of the system using the identified environmental situations of the at least two luminaires.

Further, the at least one central control unit is preferably configured to control the light emission of the at least two luminaires, in particular to change the light intensity, light color and/or color temperature of the light emission, on the basis of the identified overall environmental situation of the system.

Furthermore, the at least one central control unit is preferably configured to control the light emission of the at least one further luminaire, in particular to change the light intensity, light color and/or color temperature of the light emission, on the basis of the identified overall environmental situation of the system, in case the system comprises the at least one further luminaire.

In order to achieve the system according to a further aspect of the present invention, some or all of the above described optional features may be combined with each other.

Preferably, the system comprises at least one further luminaire, in particular at least one further street lamp, and the at least one central control unit is configured to control the light emission by the at least one further luminaire, in particular to change the light intensity, light color and/or color temperature of the light emission, on the basis of the identified environmental situation (i.e. identified by the at least one central control unit).

Additionally or alternatively, the at least one central control unit is preferably configured to control the light emission by the at least one further luminaire, in particular to change the light intensity, light color and/or color temperature of the light emission, using the information, in particular the identified environmental situation (i.e. identified by the processing unit of the at least one luminaire), received from the at least one luminaire.

Furthermore, the system preferably comprises at least two luminaires according to an aspect of the present invention, as described above, wherein each of the at least two luminaires is configured to communicate with the at least one central control unit. The at least one central control unit is configured to identify an overall environmental situation, in particular an overall street condition, of the system using the information received from the at least two luminaires; in particular using the identified environmental situations of the at least two luminaires. The environmental situations of the at least two luminaires may be identified by the processing units of the respective luminaire and communicated to the at least one central control unit or may be identified by the at least one central control unit.

Preferably, the at least one central control unit is configured to control the light emission of the at least two luminaires, in particular to change the light intensity, light color and/or color temperature of the light emission, on the basis of the identified overall environmental situation of the system.

Furthermore, the at least one central control unit is preferably configured to control the light emission of the at least one further luminaire, in particular to change the light intensity, light color and/or color temperature of the light emission, on the basis of the identified overall environmental situation of the system, in case the system comprises the at least one further luminaire.

In order to achieve the system according to another aspect of the present invention, some or all of the above described optional features may be combined with each other.

According to a further aspect of the invention, a method for identifying an environmental situation by a luminaire according to an aspect of the present invention, as described above, is provided. The method comprises the step of identifying an environmental situation of the luminaire, in particular the street condition at the street lamp, by the processing unit, on the basis of at least one characteristic of the measured environmental sound, such as the amplitude, frequency or pattern of the measured environmental sound.

In other words, a method for identifying an environmental situation of a luminaire, in particular of a street lamp, by the luminaire itself is provided, wherein the method comprises the step of identifying the environmental situation of the luminaire, in particular the street condition at the street lamp, by the processing unit of the luminaire, on the basis of at least one characteristic of the environmental sound, such as the amplitude, frequency or pattern of the environmental sound, measured by the at least one acoustic sensor of the luminaire.

The above description with regard to the luminaire according to an aspect of the invention is correspondingly valid for the method according to a further aspect of the invention.

According to another aspect of the invention a method for operating a luminaire according to an aspect of the present invention, as described above, is provided. The method comprises the steps of identifying an environmental situation of the luminaire, in particular the street condition at the street lamp, by the processing unit, on the basis of at least one characteristic of the measured environmental sound, such as the amplitude, frequency or pattern of the measured environmental sound, and controlling, by the processing unit, the light emission by the at least one lighting means, in particular changing the light intensity, light color and/or color temperature of the light emission, on the basis of the identified environmental situation.

The above description with regard to the luminaire according to an aspect of the invention is correspondingly valid for the method according to another aspect of the invention.

BRIEF DESCRIPTION OF THE DRAWINGS

In the following, the invention is described exemplarily with reference to the enclosed figures, in which.

DETAILED DESCRIPTION

In the Figures corresponding elements are denoted with identical reference signs.

Figure 1:
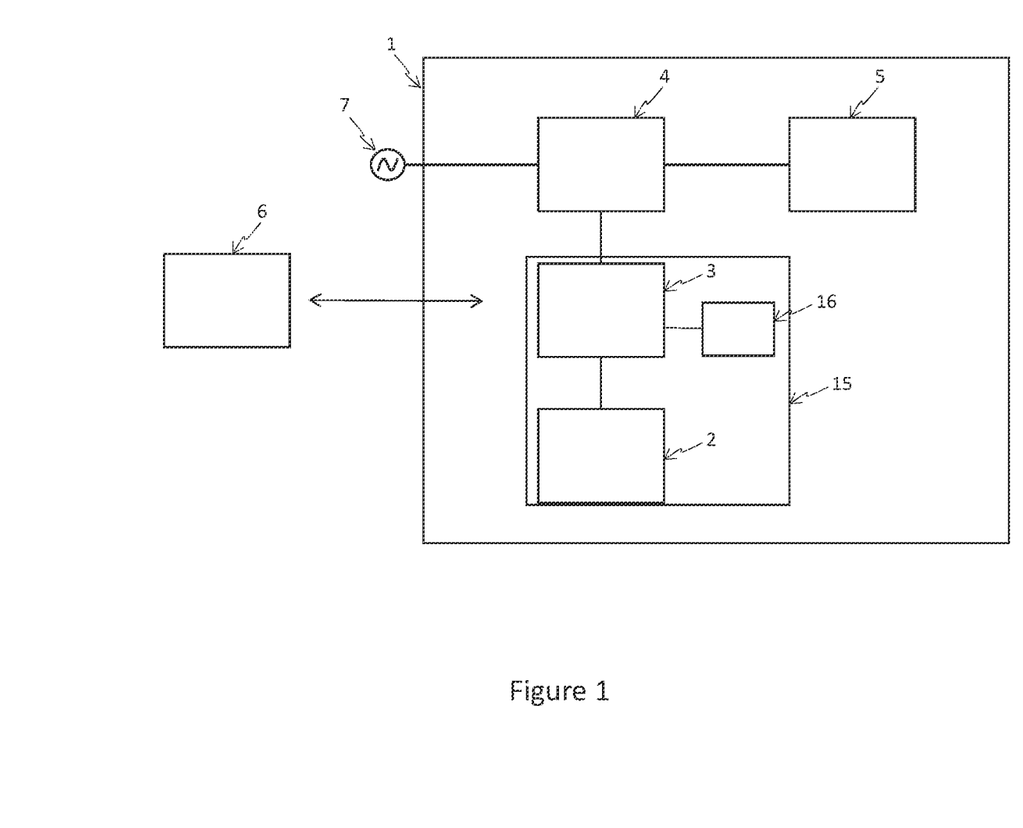
FIG. 1 is a block diagram of a luminaire according to an embodiment of the invention.

FIG. 1 is a block diagram of a luminaire according to an embodiment of the invention.

As shown in FIG. 1, a luminaire 1 comprises at least one lighting means 5, at least one acoustic sensor 2, a processing unit 3 and an operating unit 4 for providing electrical energy to the at least one lighting means 5 from an external energy source 7, such as mains and/or a battery, wherein the battery may be a rechargeable battery. The acoustic sensor 2 and the processing unit 3 are integrated in a sensor unit 15, which further comprised a memory 16 as storage unit.

The above description of the luminaire according to an aspect of the invention is also valid for the luminaire 1 of FIG. 1. That is, the above description of the at least one lighting means, the at least one acoustic sensor and the processing unit of the luminaire according to an aspect of the invention is also valid for the at least one lighting means 5, at least one acoustic sensor 2 and processing unit 3 of the luminaire 1 according to FIG. 1.

The operating unit 4 is controllable by the processing unit 3 (as indicated by the solid line between the elements 3 and 4 in FIG. 1) and is configured to supply the at least one lighting means 5 with electrical energy. Since the light emission by the at least one lighting means 5 is dependent on the electrical energy supplied by the operating unit 4 to the at least one lighting means 5, the processing unit 3 is configured to control the light emission by the at least one lighting means 5 by controlling the operating unit 4. In particular, by controlling the energy supply by the operating unit 4 to the at least one lighting means 5. The term "lighting means driver" may be used as a synonym for the term "operating unit". For controlling the light emission of the lighting means 5, the sensor unit 15 and the operating unit 4 are connected such that the processing unit 3 can send information about identified environmental situations or control information derived by the processing unit 3 based on the identified environmental situations to the operating unit 4. The sensor unit 15 and the operation unit 15 both may be connected to a bus system. For lighting applications, DALI or DALI-2 are preferred.

Preferably, the operating unit 4 is configured to convert electrical energy, in particular an input voltage or input current, supplied from the external energy source 7, such as mains, into a different electrical energy level, in particular a higher or lower output voltage or output current. Further, the operating unit 4 preferably comprises at least one actively switched DC-to-DC converter with at least one switch, such as a transistor, and at least one electrical energy storage, such as a choke or an inductivity. An input voltage or current may be converted by the DC-to-DC converter into a higher or lower output voltage or current, depending on the type of DC-to-DC converter, by actively switching the at least one switch. Examples of an actively switched DC-to-DC converter are a boost converter, a buck converter, a flyback converter, a resonant converter etc.

In case the operating unit 4 comprises at least one actively switched DC-to-DC converter, the processing unit 3 is configured to control the switching of the at least one switch of the DC-to-DC converter in order to control the electrical energy provided by the operating unit 4 to the at least one lighting means 5. Controlling the switching of the at least one switch also includes indirect control by providing information on an identified environmental situation or control information. The provided information may then internally in the operation unit 4 processed to generate a switch signal, which switches the switch in the end.

The at least one acoustic sensor 2 is configured to measure environmental sound and to provide the measurement results to the processing unit 3 (as indicated by the solid line between the elements 2 and 3 in FIG. 1).

The processing unit 3 is configured to process the measured environmental sound, received from the at least one acoustic sensor 2, in order to identify an environmental situation of the luminaire 1. That is, the processing unit 3 is configured to identify the environmental situation of the luminaire 1 on the basis of at least one characteristic of the measured environmental sound, such as the amplitude, frequency or pattern of the measured environmental sound. In particular, the processing unit 3 is configured to identify the environmental situation of the luminaire 1 on the basis of the amplitude, frequency and/or pattern of the measured environmental sound. A correspondence between measured values of characteristics (or changes thereof) and associated environmental situations are stored in the memory 16. Further, the memory can store a correspondence table, for example, a look-up table, to enable determination of control information based on an identified environmental situation. The memory 16 may further store algorithms for computing environmental situations from the measured sound.

The processing unit 3 is preferably configured to detect a change of the at least one characteristic of the environmental sound measured by the at least one acoustic sensor 2 and to identify on the basis of the detected change of the at least one environmental sound characteristic the environmental situation of the luminaire 1.

As outlined already above, the sound caused by a vehicle driving over ice or snow on a street is different to the sound caused by a vehicle driving on a street without ice and snow. Weather conditions, such as light rainfall, heavy rainfall, wind, thunder etc., each cause a characteristic environmental sound that is indicative of/characteristic of the respective weather condition. For example, in case there is heavy rainfall, this causes an environmental sound indicative of the heavy rainfall, which may be measured by the at least one acoustic sensor 2 of the luminaire 1.

The processing unit 3 of the luminaire 1 may then identify on the basis of the measured environmental sound the presence of heavy rainfall as the environmental situation of the luminaire 1.

Moreover, street users, such as vehicles, motorcycles, bicycles, persons, each cause a characteristic environmental sound that is indicative of the respective street user.

For example, in case there is a vehicle passing by the luminaire 1, this causes an environmental sound indicative of the moving vehicle, which may be measured by the at least one acoustic sensor 2 of the luminaire 1. The processing unit 3 of the luminaire 1 may then identify on the basis of the measured environmental sound the passing by of a vehicle as the environmental situation of the luminaire 1.

Furthermore, the sound caused by a vehicle driving on a street with a damage, such as a pothole, is different to the sound caused by the vehicle driving on a street without any damage, i.e. with a smooth street surface. Thus, the processing unit 3 may identify on the basis of the environmental sound whether the street comprises a damage, such as a pothole, or not.

The processing unit 3 is configured to control the light emission by the at least one lighting means 5 on the basis of the identified environmental situation. In particular, the processing unit 3 is configured to change the light intensity, light color and/or color temperature of the light emission by the at least one lighting means 5 on the basis of the identified environmental situation. To control the light emission the processing unit 3 generates control information or provides information on the identified environmental situation to the operation unit 4.

The processing unit 3 is configured to communicate the identified environmental situation and/or the contol information derived therefrom to extern. In particular, the processing unit 3 is configured to communicate with at least one element of a system 6, such as at least one central control unit of the system 6 (as indicated in FIG. 1 by the solid line between the elements 15 and 6). The luminaire 1 may be a part of the system 6.

The processing unit 3 is a part of the sensor unit 15. This case is shown in FIG. 2A showing a sensor unit 15 including the acoustic sensor 2 with a processing unit.

Figure 2A:
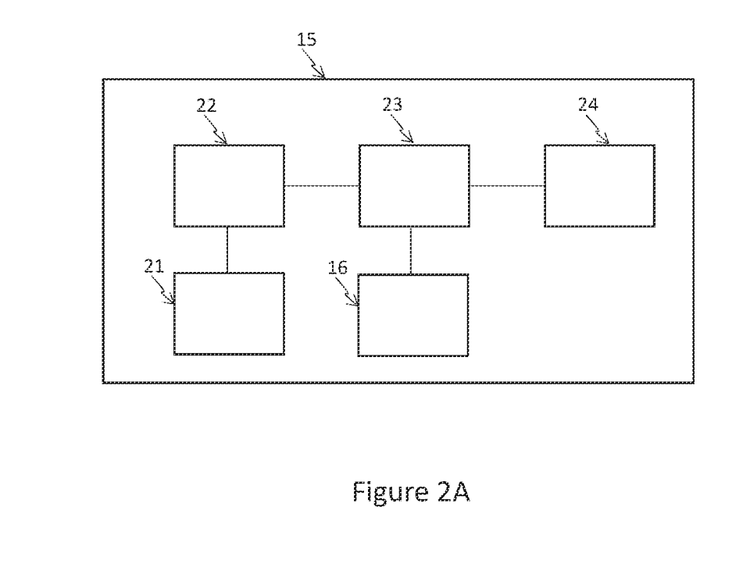
FIGS. 2A and 2B are each a block diagram of an acoustic sensor of a luminaire according to an embodiment of the invention.
Figure 2B:
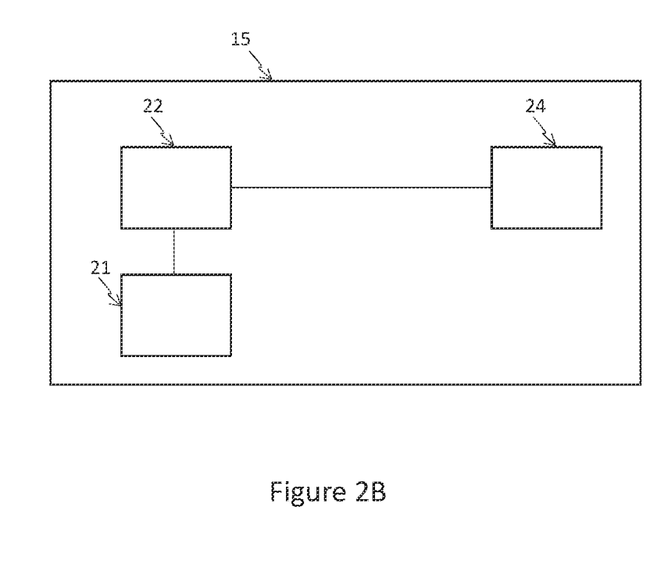

FIGS. 2A and 2B are each a block diagram of sensor units of a luminaire according to an embodiment of the invention.

The sensor units of FIGS. 2A and 2B may be used in a luminaire according to an aspect of the invention. The sensor unit 15 of FIG. 2B may be used in a luminaire of the system according to a further aspect of the invention and in a luminaire of the system according to another aspect of the invention.

The above description with respect to the at least one sensor unit 15 of the luminaire according to an aspect of the invention and the above description with respect to the at least one sensor unit of the luminaire of FIG. 1 is also valid for the sensor units of FIGS. 2A and 2B.

The sensor unit 15 of FIG. 2A comprises
- a microphone 21 as acoustic sensor for measuring the environmental sound,
- a signal processing unit 22 for signal processing the measurement signals received from the microphone 21, a processing unit 23 for identifying an environmental situation on the basis of at least one characteristic of the environmental sound measured by the microphone 21 and optionally signal processed by the signal processing unit 22, a memory 16, and a communication interface 24 for communicating with the operation unit 4 and/or extern, in particular for communicating information to extern.

The at least one characteristic of the environmental sound may be an amplitude, frequency or pattern of the environmental sound. The information communicated by the communication interface 24 may be the identified environmental situation.

The communication interface 24 is configured for a wireless and/or wired communication with extern. The communication interface 24 may be an interface according to the DALI (Digital Addressable Lighting Interface) industry standard or DALI-2 industry standard.

The processing unit 23 is configured to perform the processes that may be performed by the processing unit of the luminaire according to an aspect of the invention as described above, in particular by the processing unit 3 of the luminaire 1 of FIG. 1. That is, the processing unit 23 preferably corresponds to the processing unit 3 of the luminaire 1 according to an aspect of the invention of FIG. 1.

The acoustic sensor of FIG. 2B differs to the acoustic sensor of FIG. 2A in that the acoustic sensor of FIG. 2B does not comprise a processing unit 23.

That is, the sensor unit of FIG. 2B comprises a microphone 21 as acoustic sensor 2 for measuring the environmental sound, an optional signal processing unit 22 for signal processing the measurement signals received from the microphone 21, and a communication interface 24 for communicating with extern or to a separate processing unit within the luminaire.

In particular, the communication interface 24 is configured to communicate the measurement results (measured environmental sound) of the microphone 21, which may be signal processed by the optional signal processing unit 22, to extern.

The communication interface 24 is configured for a wireless and/or wired communication with extern. The communication interface 24 may be an interface according to the DALI (Digital Addressable Lighting Interface) industry standard or DALI-2 industry standard. In particular, the communication interface 24 is configured to communicate the acoustic sound measured by the acoustic sensor 2, in particular by the microphone 21, to a processing unit of a luminaire and/or to a central control unit extern to the luminaire, in case the acoustic sensor is part of the luminaire.

Figure 3:
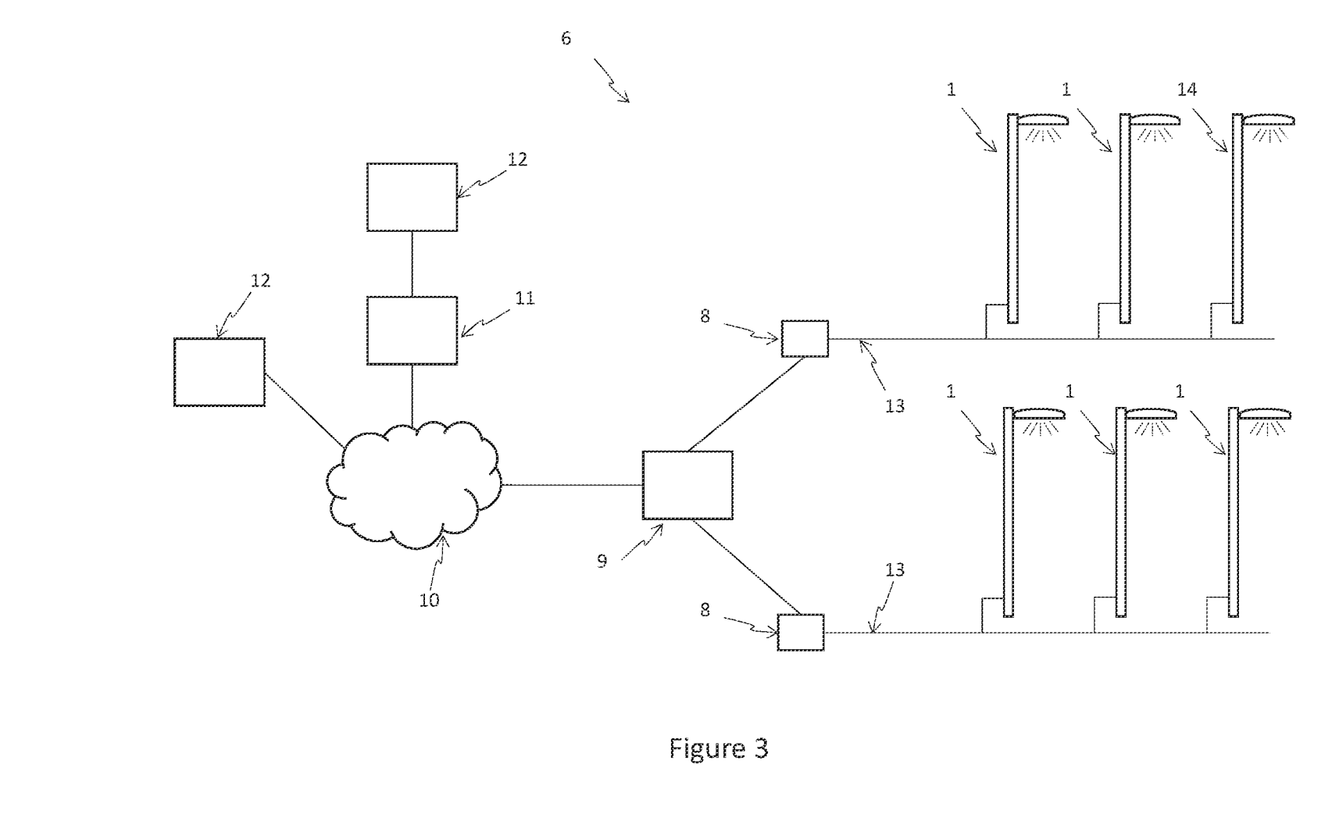
FIG. 3 is a block diagram of a system according to an embodiment of the invention.

FIG. 3 is a block diagram of a system according to an embodiment of the invention.

Thus, the above description with regard to the system according to a further aspect of the invention and the description with regard to the system according to another aspect of the invention is also valid for the system 6 of FIG. 3.

As shown in FIG. 3, the system 6 comprises a plurality of luminaires. Namely, the system 6 comprises five luminaires 1 comprising at least one acoustic sensor for providing lighting and measuring environmental sound and one further luminaire 14 for providing lighting. The system 6 may comprise also a different number of luminaires 1 and 14. That is, the number of luminaires shown in FIG. 3 is only by way of example for describing an embodiment of the invention and is not limiting the invention.

At least one of the luminaires 1 corresponds to the luminaire according to an aspect of the invention, as described above, in particular to the luminaire 1 according to FIG. 1. Therefore, the description with regard to the luminaire according to an aspect of the invention and the description with regard to the luminaire 1 of FIG. 1 is valid for this at least one luminaire 1.

On the top of FIG. 3, two luminaires 1 and the further luminaire 14 are electrically supplied from a common supply line 13 and, on the bottom of FIG. 3, three luminaires 1 are electrically supplied from a common supply line 13. These two groups of luminaires may for example correspond to the luminaires of two different streets.

The luminaires of each group may communicate via the respective supply line 13 (power line communication) with a corresponding communication sub-unit 8, such as a concentrator unit.

Each communication sub-unit 8 may then communicate data to an optional communication unit 9. The communication unit 9 is configured to communicate via a network 10, such as the internet, data to central control units 12. Alternatively or additionally, at least one of the communication sub-units 8 may communicate directly data via the network 10. In particular, the communication unit 9 and/or at least one of the communication sub-units 8 are configured to communicate data to an optional server 11 of the system 6. At least one central control unit 12 is configured to communicate data via the server 11, in particular to receive data from the server 11.

The communication between the elements of the system 6 may be wireless and/or wire-bound and is not limited to a specific communication method and communication protocol.

The number of central control units 12, optional server 11, optional communication unit 9 and communication sub-units 8 of the system 6 of FIG. 3 is only by way of example for explaining an embodiment of the invention and is not limiting the invention. The number of control units 12, optional server 11, optional communication unit 9 and communication sub-units 8 may, thus, be different compared to the number shown in FIG. 3.

The following explanation with regard to one central control unit 12 of the system 6 is also valid for the other central control unit(s) 12 of the system 6.

The central control unit 12 may receive from one or more luminaires 1 an identified environmental situation and/or control information. On the basis of the received information of a first luminaire 1 or a plurality of luminaires, the central control unit 12 may control the light emission by the first luminaire and/or control the light emission by at least one other luminaire, such as another luminaire 1 or the further luminaire 14. Collecting information from a plurality of luminaires allows to determine an improved situation understanding. In case that the resulting control of a luminaire 1 contradicts the control of a luminaire performed internally in the luminaire 1, the local control of the luminaire may be overruled by control information receive from the central control unit 12. The luminaires 1 may also be configured to ignore control information received from extern.

Additionally, the central control unit 12 may receive from one or more luminaires 1, which do not comprise a processing unit but at least one acoustic sensor, measured environmental sound.

The central control unit 12 is configured to identify on the basis of the measured environmental sound, in particular on the basis of at least one characteristic of the measured environmental sound, an environmental situation of the respective luminaire 1. On the basis of the identified environmental situation of the respective luminaire 1, the central control unit 12 may control the light emission by the respective luminaire 1 and/or control the light emission by at least one other luminaire, such as another luminaire 1 or the further luminaire 14.

The central control unit 12 may identify on the basis of the measured environmental sound received from at least two luminaires 1 an overall environmental situation of the system 6.

Additionally or alternatively, the central control unit 12 may identify on the basis of the environmental situations of at least two luminaires 1 an overall environmental situation of the system 6.

The central control unit 12 may control the light emission by at least one luminaire of the system 6 on the basis of the identified overall environmental situation of the system 6.

Controlling the light emission of a luminaire by the central control unit 12 may include changing the light intensity, light color and/or color temperature of the light emission but also geometry and/or direction of the emitted light. For changing the direction and/or opening angle of the emitted light, the luminaire may comprise actuators for actuating optical devices of the luminaire.

For example, in case the two luminaires 1 and the one further luminaire 14 on the top of FIG. 3 correspond to street lamps of a street, wherein the two luminaires 1 are placed at different spots of the street, e.g. one at the beginning and one at the end of the street, then the central control unit 12 is configured to identify respectively determine an overall street condition (overall environmental situation) of the street on the basis of the environmental situation of each of the two luminaires 1. The environmental situation of each of the two luminaires 1 may be identified directly by a processing unit of the respective luminaire 1 or by the central control unit 12.

What is claimed is:

1. A luminaire (1), in particular a street lamp, comprising at least one lighting means (5);
at least one sensor unit (15) including an acoustic sensor (2) that is a microphone configured to measure environmental sound in the vicinity of the street lamp, and a processing unit (3) that receives information from the acoustic sensor, wherein the processing unit (3) is configured to identify an environmental situation of the luminaire (1), in particular a street condition at the street lamp and whether the street condition comprises one of an icy street condition and snow-covered street condition, on the basis of characteristics of the measured environmental sound in the vicinity of the street lamp, said characteristics of the measured environmental sound comprising an amplitude, frequency and pattern of the measured environmental sound.

2. The luminaire (1) according to claim 1, wherein the processing unit (3) is configured to detect a change of the characteristics of the environmental sound measured by the acoustic sensor (2) and to identify on the basis of the detected change of the environmental sound characteristics the environmental situation of the luminaire (1).

3. The luminaire (1) according to claim 1, wherein the processing unit (3) is configured to control the light emission by the at least one lighting means (5), in particular to change a light intensity, light color and/or color temperature of the light emission, on the basis of the identified street condition.

4. The luminaire (1) according to claim 1, wherein the processing unit (3) is configured to communicate the identified environmental situation to an operating unit (4) of the luminaire (1) or an external control unit.

5. The luminaire (1) according to claim 1, wherein the processing unit (3) is configured to determine control information based on the identified environmental situation and to communicate the determined control information to the operating unit (4) of the luminaire (1) or an external control unit.

6. The luminaire (1) according to claim 1, wherein
the processing unit (3) is configured to identify the environmental situation out of a list of different environmental situations, wherein the different environmental situations are linked to different threshold values or ranges for the characteristics of the measured environmental sound;
the processing unit (3) is configured to identify the environmental situation out of a list of different environmental situations, wherein the different environmental situations are linked to different threshold values or ranges for the detected change of the environmental sound characteristics; and/or
the processing unit is configured to identify the environmental situation by processing the measured environmental sound using mathematical algorithms.

7. The luminaire (1) according to claim 1, wherein the processing unit (3) is configured to identify the environmental situation using at least one additional time information comprising time of year information.

8. The luminaire (1) according to claim 1, wherein the processing unit (3) is configured to detect at least one environmental event, on the basis of the characteristics of the measured environmental sound and detect the frequency of the occurrence of the detected event within a time range in order to identify the characteristics of the identified environmental situation.

9. The luminaire (1) according to claim 1, wherein the processing unit is configured to detect a speed of a moving vehicle on the basis of the measured environmental sound.

10. The luminaire (1) according to claim 1, wherein
the processing unit (3) is configured to repeatedly process with a time interval the characteristics of the environmental sound measured by the acoustic sensor (2), and/or
the processing unit (3) is configured to process the characteristics of the environmental sound measured by the acoustic sensor (2) in response to a command received from extern.

11. The luminaire according to claim 1, wherein the processing unit is configured to further identify whether the street condition in its vicinity comprises a wet condition.

12. The luminaire according to claim 1, wherein the processing unit is configured to further identify whether the street condition in its vicinity comprises a dry condition.

13. The luminaire according to claim 1, wherein the processing unit receives temperature information, and the processing unit is configured to also use the temperature information to identify the street condition of the street lamp.

14. The luminaire according to claim 1 wherein the luminaire further comprises an additional sensor comprising a light sensor or a motion sensor, and processing unit sets or controls the additional sensor based on the identified street condition.

15. A street lighting system, comprising
multiple luminaires (1), each comprising a street lamp, and
a central control unit (12) for controlling the multiple luminaires (1), wherein
each luminaire (1) comprises
- at least one lighting means (5), and
- an acoustic sensor (2) configured to measure environmental sound in the vicinity of the street lamp, and further comprising a processing unit (3) that receives information from the acoustic sensor and is configured to identify a street condition at the street lamp and whether the street condition comprises one of a dry condition, a wet condition, an icy condition, and a snow covered condition, on the basis of the characteristics of the measured environmental sound in the vicinity of the street lamp, said characteristics comprising an amplitude, frequency and pattern of the measured environmental sound, wherein each luminaire (1) is configured to communicate the identified street condition therefrom to the central control unit (12).

16. The system (6) according to claim 15, wherein the central control unit (12) is configured to control the light emission by the luminaires, in particular to change a light intensity, light color and/or color temperature of the light emission, on the basis of the identified street conditions.

17. The system according to claim 15, wherein the processing unit of each luminaire receives temperature information, and is configured to also use the temperature information to identify the street condition of the respective street lamp.

* * * * *